United States Patent [19]

Shibuta

[11] Patent Number: 5,802,535
[45] Date of Patent: *Sep. 1, 1998

[54] DOCUMENT PROCESSING APPARATUS FOR EDITING AND GENERATING DOCUMENTS

[75] Inventor: Kazuo Shibuta, Nakai-machi, Japan

[73] Assignee: Fuji Xerox Co., Ltd., Tokyo, Japan

[*] Notice: The term of this patent shall not extend beyond the expiration date of Pat. No. 5,537,522.

[21] Appl. No.: 591,401

[22] Filed: Jan. 25, 1996

[30] Foreign Application Priority Data

Feb. 3, 1995 [JP] Japan .................. 7-037795

[51] Int. Cl.$^6$ .................................. G06T 5/00
[52] U.S. Cl. ................................ 707/523; 345/433
[58] Field of Search ..................... 395/785, 790, 395/770, 133; 358/401; 707/523, 528, 509; 345/433; 382/113

[56] References Cited

U.S. PATENT DOCUMENTS

| | | | |
|---|---|---|---|
| 5,179,650 | 1/1993 | Fukui et al. | 395/148 |
| 5,208,905 | 5/1993 | Takakura et al. | 395/148 |
| 5,230,040 | 7/1993 | Yamashita et al. | 395/148 |
| 5,325,441 | 6/1994 | Hoecker | 382/113 |
| 5,392,130 | 2/1995 | Mahoney | 348/400 |
| 5,537,522 | 7/1996 | Shibuta et al. | 395/133 |
| 5,566,289 | 10/1996 | Ikeo et al. | 395/148 |

FOREIGN PATENT DOCUMENTS

| | | |
|---|---|---|
| 61-32712 | 7/1986 | Japan . |
| 62-65126 | 3/1987 | Japan . |
| 64-15889 | 1/1989 | Japan . |
| 1-173178 | 7/1989 | Japan . |
| 2-22375 | 1/1990 | Japan . |
| 2-223275 | 9/1990 | Japan . |
| 3-18987 | 1/1991 | Japan . |
| 3-109874 | 5/1991 | Japan . |
| 3-122773 | 5/1991 | Japan . |
| 4-142679 | 5/1992 | Japan . |
| 4-172574 | 6/1992 | Japan . |
| 4-324577 | 11/1992 | Japan . |
| 5-739 | 1/1993 | Japan . |
| 5-73685 | 3/1993 | Japan . |
| 6-215099 | 8/1994 | Japan . |
| 7-220101 | 8/1995 | Japan . |

OTHER PUBLICATIONS

"7Q7 A Study on Evaluation Scales for Document Design Quality", Tsuyoshi Tanaka et al., 42the oho Shori Gakkai (Information Processing Society) National Symposium 1991, pp. 3-331 to 3-333.

"Presentation & Documentation", Fuji Xerox Co., Ltd., 1989, pp. 62-87.

"Business document no enshutsu giho II" (Technique for Making Business Documents Look Better II, Fuji Xerox Co., Ltd. and Coa Design Co., Ltd, 1992, pp. 105-123.

Primary Examiner—Joseph H. Feild
Assistant Examiner—Stephen Hong
Attorney, Agent, or Firm—Oliff & Berridge, P L C

[57] ABSTRACT

The apparatus prepares a plurality of documents, each of which potentially having a different portion changed in accordance with simple operations. Portions to be changed are determined automatically or are partly based on the user's instructions. Portions to be changed can be partially extracted and uniquely emphasized. A plurality of outputted documents corresponding to an original document are automatically formed, each outputted document having a selected design preference applied to selected portions.

21 Claims, 20 Drawing Sheets

| ELEMENT NUMBER | ELEMENT TYPE | COORDINATE VALUE (mm) $(X_0, Y_0), (X_1, Y_1), \cdots, (X_n, Y_n)$ | ELEMENT PROPERTY |
|---|---|---|---|
| 1 | SCALE 1 ON Y-AXIS | (30.0 , 145.0) , (40.0 , 150.0) | |
| 2 | SCALE 2 ON Y-AXIS | (30.0 , 195.0) , (40.0 , 200.0) | |
| 3 | SCALE 3 ON Y-AXIS | (31.0 , 245.0) , (40.0 , 250.0) | |
| 4 | BACKGROUND 1 | (40.0 , 150.0) , (170.0 , 260.0) | |
| 5 | BAR 1 | (50.0 , 230.0) , (60.0 , 260.0) | EMPHASIS |
| 6 | BAR 2 | (60.0 , 210.0) , (70.0 , 260.0) | |
| 7 | BAR 3 | (70.0 , 220.0) , (80.0 , 160.0) | |

⋮

| 14 | BAR 1 | (130.0 , 230.0) , (140.0 , 260.0) | EMPHASIS |
|---|---|---|---|
| 15 | BAR 2 | (140.0 , 210.0) , (150.0 , 260.0) | |
| 16 | BAR 3 | (150.0 , 220.0) , (160.0 , 160.0) | |
| 17 | EXPLANATION 1 | (60.0 , 220.0) , (70.0 , 225.0) | |
| 18 | EXPLANATION 2 | (70.0 , 220.0) , (80.0 , 205.0) | |
| 19 | EXPLANATION 3 | (80.0 , 210.0) , (90.0 , 215.0) | |
| 20 | SCALE 1 ON X-AXIS | (30.0 , 265.0) , (35.0 , 270.0) | |
| 21 | SCALE 2 ON X-AXIS | (60.0 , 265.0) , (65.0 , 270.0) | |
| 22 | SCALE 3 ON X-AXIS | (90.0 , 265.0) , (95.0 , 270.0) | |
| 23 | SCALE 4 ON X-AXIS | (120.0 , 265.0) , (125.0 , 270.0) | |
| 24 | SCALE 5 ON X-AXIS | (150.0 , 265.0) , (125.0 , 270.0) | |

FIG.9

| ROW NO. | COLUMN NO. | X COORDINATE FOR UPPER LEFT POINT (mm) | Y COORDINATE FOR UPPER LEFT POINT (mm) | X COORDINATE FOR LOWER RIGHT POINT (mm) | Y COORDINATE FOR LOWER RIGHT POINT (mm) | ELEMENT PROPERTY |
|---|---|---|---|---|---|---|
| 1 | 1 | 30.0 | 100.0 | 65.0 | 110.0 | |
| 1 | 2 | 65.0 | 100.0 | 100.0 | 110.0 | |
| 1 | 3 | 100.0 | 100.0 | 135.0 | 110.0 | EMPHASIS |
| 1 | 4 | 135.0 | 100.0 | 170.0 | 110.0 | |
| 2 | 1 | 30.0 | 110.0 | 65.0 | 120.0 | |
| 2 | 2 | 65.0 | 110.0 | 100.0 | 120.0 | |
| 2 | 3 | 100.0 | 110.0 | 135.0 | 120.0 | EMPHASIS |
| 2 | 4 | 135.0 | 110.0 | 170.0 | 120.0 | |

⋮

| | | | | | | |
|---|---|---|---|---|---|---|
| 7 | 1 | 30.0 | 160.0 | 65.0 | 170.0 | |
| 7 | 2 | 65.0 | 160.0 | 100.0 | 170.0 | |
| 7 | 3 | 100.0 | 160.0 | 135.0 | 170.0 | EMPHASIS |
| 7 | 4 | 135.0 | 160.0 | 170.0 | 170.0 | |

FIG.10

| ELEMENT PROPERTY | AMOUNT OF CYAN (%) | AMOUNT OF MAGENTA (%) | AMOUNT OF YELLOW (%) | AMOUNT OF BLACK (%) |
|---|---|---|---|---|
| BAR 1 | 45 | 15 | 15 | 0 |
| BAR 2 | 45 | 45 | 15 | 0 |
| BAR 3 | 60 | 30 | 40 | 0 |
| BAR 4 | 45 | 15 | 35 | 0 |
| BAR 5 | 55 | 35 | 25 | 0 |
| BAR (EMPHASIS) | 50 | 60 | 10 | 0 |
| BACKGROUND | 20 | 10 | 20 | 0 |
| SCALE | 0 | 0 | 0 | 70 |
| EXPLANATION 1 | 100 | 30 | 20 | 20 |
| EXPLANATION 2 | 60 | 70 | 0 | 20 |
| EXPLANATION 3 | 10 | 50 | 60 | 20 |

FIG.11A

| | AMOUNT OF CYAN (%) | AMOUNT OF MAGENTA (%) | AMOUNT OF YELLOW (%) | AMOUNT OF BLACK (%) |
|---|---|---|---|---|
| EMPHASIS | 10 | 30 | 25 | 0 |
| NON-EMPHASIS | 20 | 15 | 0 | 0 |

FIG.11B

DOCUMENT PROCESSING APPARATUS FOR EDITING AND GENERATING DOCUMENTS

BACKGROUND OF THE INVENTION

1. Field of the Invention

The present invention relates to a document processing apparatus for preparing various documents in which designs for different portions in the documents are changed.

2. Description of the Related Art

In recent years, documents can be prepared and processed easily also in ordinary offices due to popularization of document forming apparatus such as DTP (Desk Top Publishing) or word processors, or digital copying machines having a document processing function. In particular, because an apparatus equipped with improved functions capable of selecting various parameters such as page layout of documents, and fonts and sizes of letters for a wide range have been generalized recently, versed and experienced users, if taking much time, can now prepare documents at high quality along with their intention.

However, in the conventional method, similar design changes to a plurality of documents have to be done by a user per se by giving an editing instruction to each of documents. Referring particularly to graphs and tables, rows and columns of a table, bars of a histogram, sectors of a circular graph and segments of a broken-line graph have generally been changed for design expressing emphasis or the like by color identification. When they are used as data to be distributed, a plurality of documents having different design changed portions depending on destinations are some time prepared. In this case, an editing operation of changing the design and an outputting operation of visualizing the edited documents have to be repeated by the number of documents to be distributed. In addition, such operations are extremely complicated and time and labor consuming operation.

It is an object of the present invention to automatically form a plurality of documents in which the design of one or more selected portions of an input document is changed in accordance with a simple instruction, and to provide a "user friendly" user interface.

In one aspect of the invention, the document processing apparatus of the present invention comprises an original image inputting module, an associated input image memory, a design change instruction input module, a module for determining one or more portions to be changed in a plurality of documents to be generated, and a module for generating outputted documents. Each of the generated documents can have a different changed portion in accordance with the inputted design change instructions. A graph/table region extracting module extracts areas of the image included in the input image memory. A design change portion determining module determines a portion to be changed in design in accordance with the data developed by the graph/table region extracting module and with instructions inputted by the user. An element property providing module associates an element property, (e.g., "emphasis") with each constituent element (e.g., bar) of the graph or table. A coloring module using predetermined rules can be used to apply color. The apparatus has a user interface for displaying and selecting candidates for the possible patterns of portions to be changed in each generated document. During operation, a user provides design change instructions and selects one of the displayed candidates via the input module.

According to another aspect of the present invention, the design change portion determining module functions automatically with predetermined rules. Based on the result of a prior selection step, the module determines candidates for the type of design change, (e.g., "emphasis") and the element type (e.g., "bar 3" of a graph) to be changed.

According to another aspect of the present invention, the document processing apparatus is applied to a document editing apparatus such as a word processor. The above described modules function in combination with well known input and processing means, including a keyboard, a display, a mouse, memory, and processing and outputting means.

BRIEF DESCRIPTION OF THE DRAWINGS

FIG. 9 is an example of a data structure of a histogram;

FIG. 10 is an example of a data structure of a table;

FIG. 11A shows examples of coloring parameters regarding coloration of a histogram;

FIG. 11B shows examples of coloring parameters regarding coloration of a table;

DESCRIPTION OF THE PREFERRED EMBODIMENTS

Figure 1:
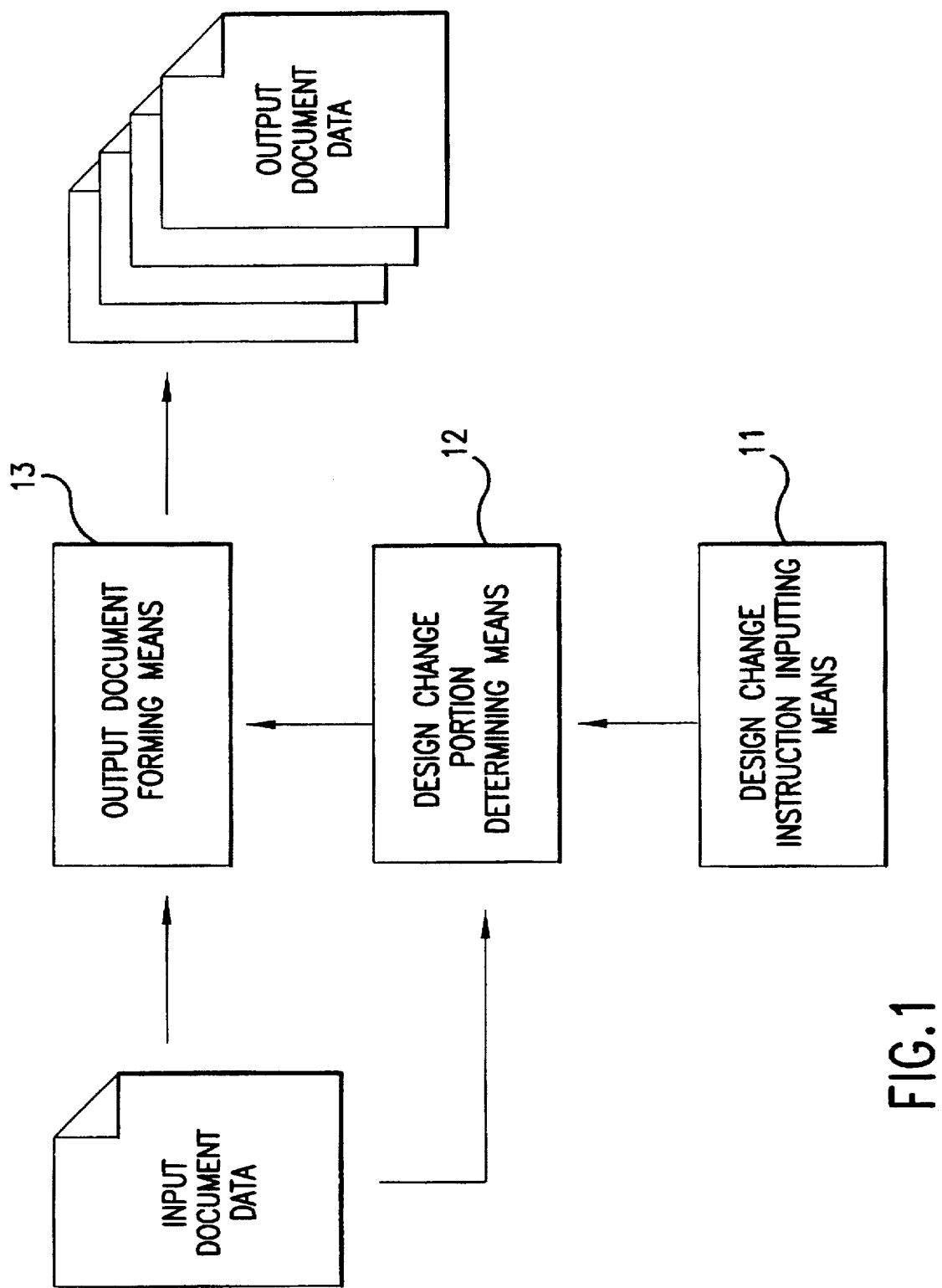
FIG. 1 is a block diagram illustrating a document processing apparatus according to the present invention.
Figure 19:
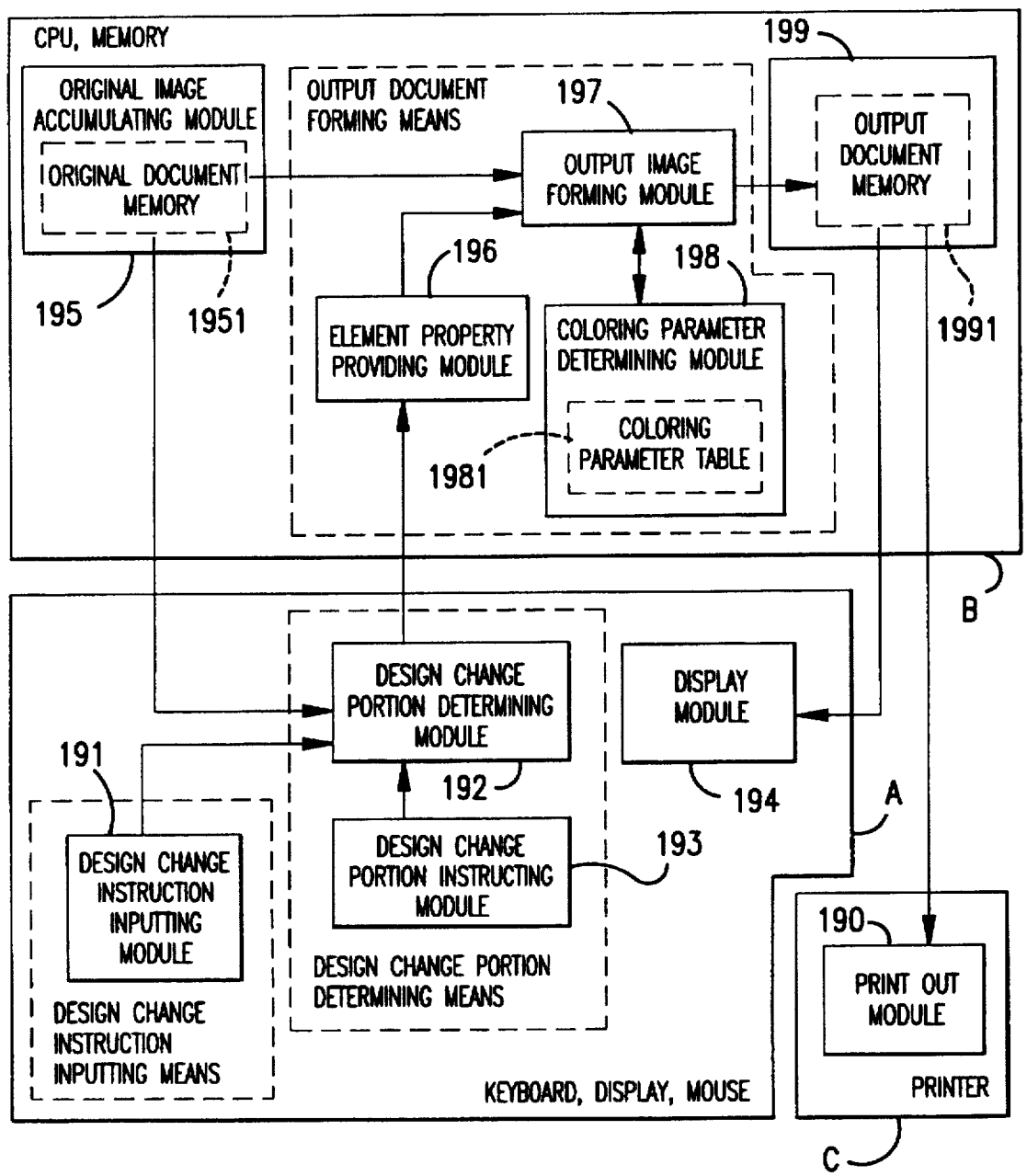
FIG. 19 is a block diagram illustrating the fourth embodiment.

FIG. 1 is an example showing a general constitution of this invention. Detail is illustrated in FIG. 2 or FIG. 19.

(Embodiment 1)

Description will be made to the first embodiment in which the present invention is applied to a digital color copying machine having a function of changing the design of documents and which changes a portion of a document into a design expressing emphasis. FIG. 2 shows a block diagram of the first embodiment.

Figure 2:
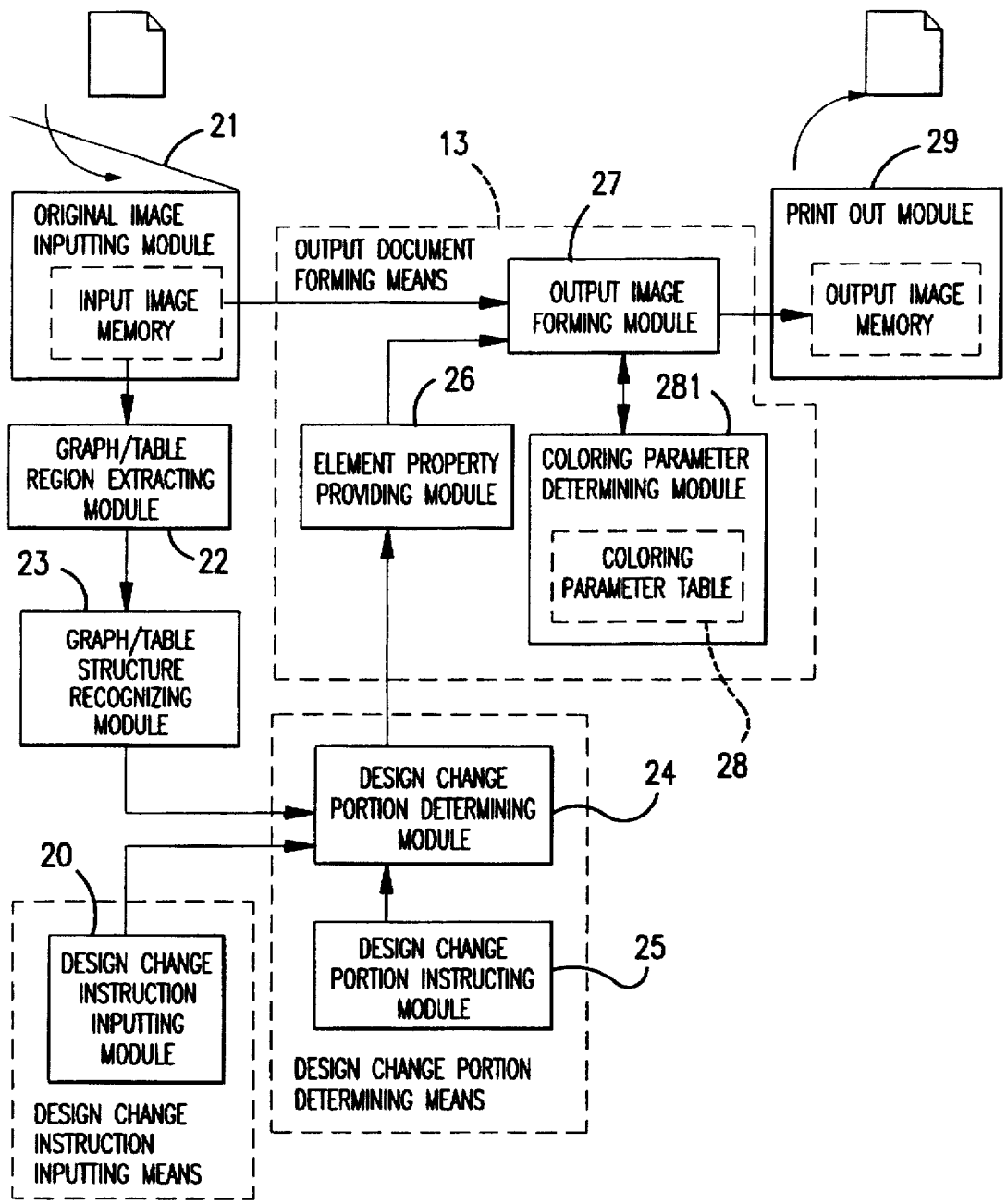
FIG. 2 is a block diagram illustrating the first embodiment.

As shown in FIG. 2, an apparatus in this embodiment comprises a design change instruction inputting module 20 and other modules described below.

(Design Change Instruction Inputting Module 20)

Figure 6A:
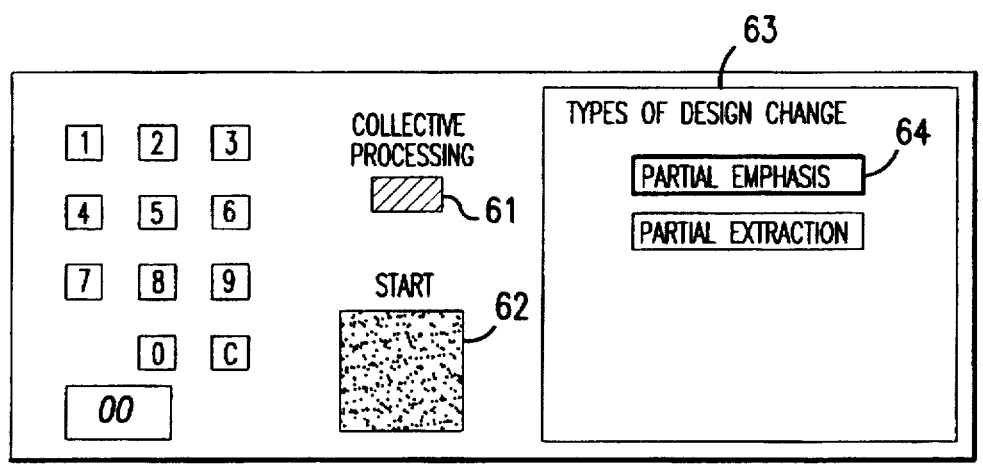
FIG. 6A is an example of operation panel for selecting the type of design change.
Figure 12:
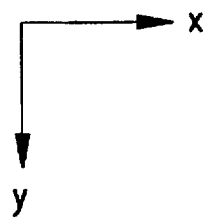
FIG. 12 is an example of an output image emphasizing "bar 1" of a histogram.
Figure 12:
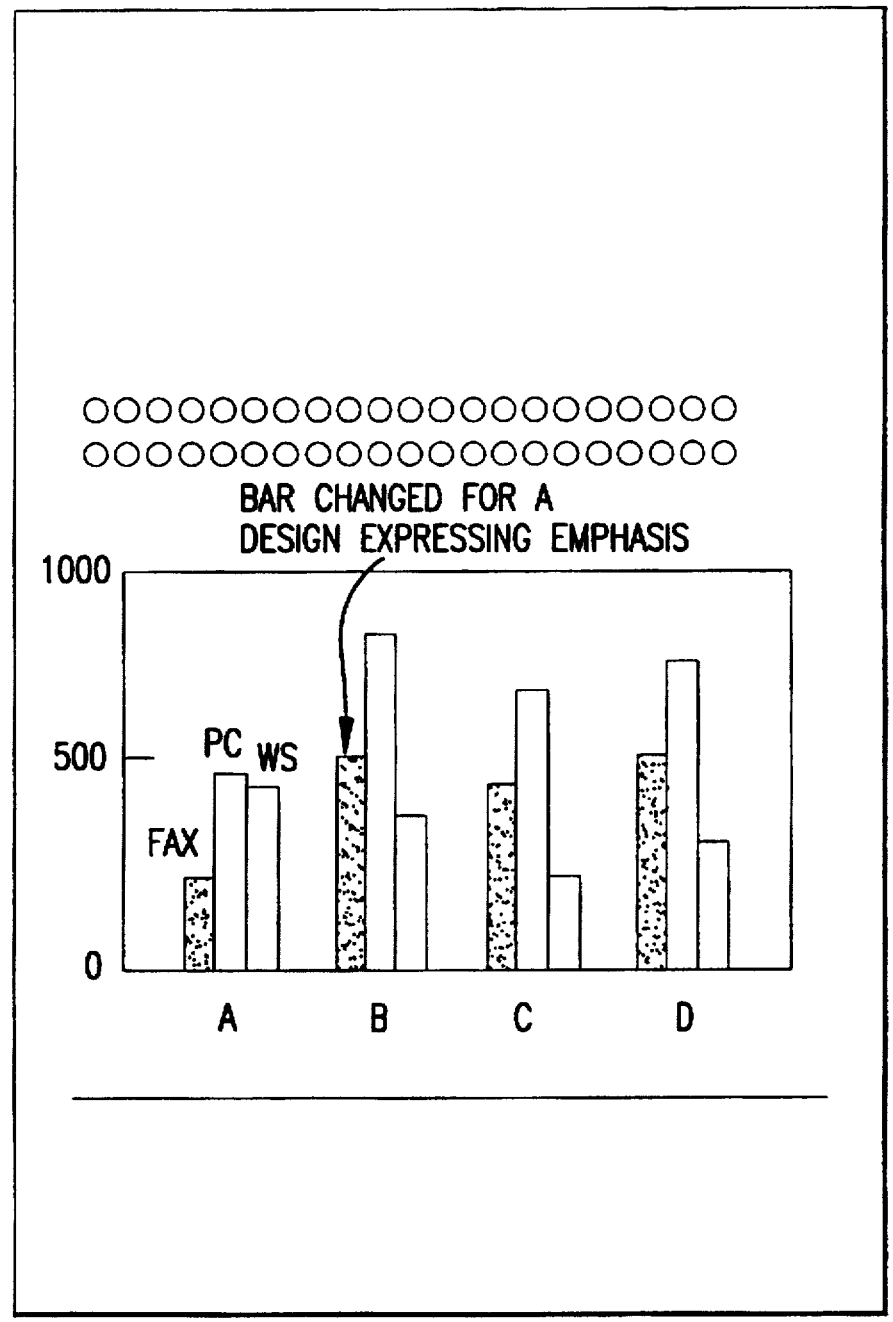
Figure 13:
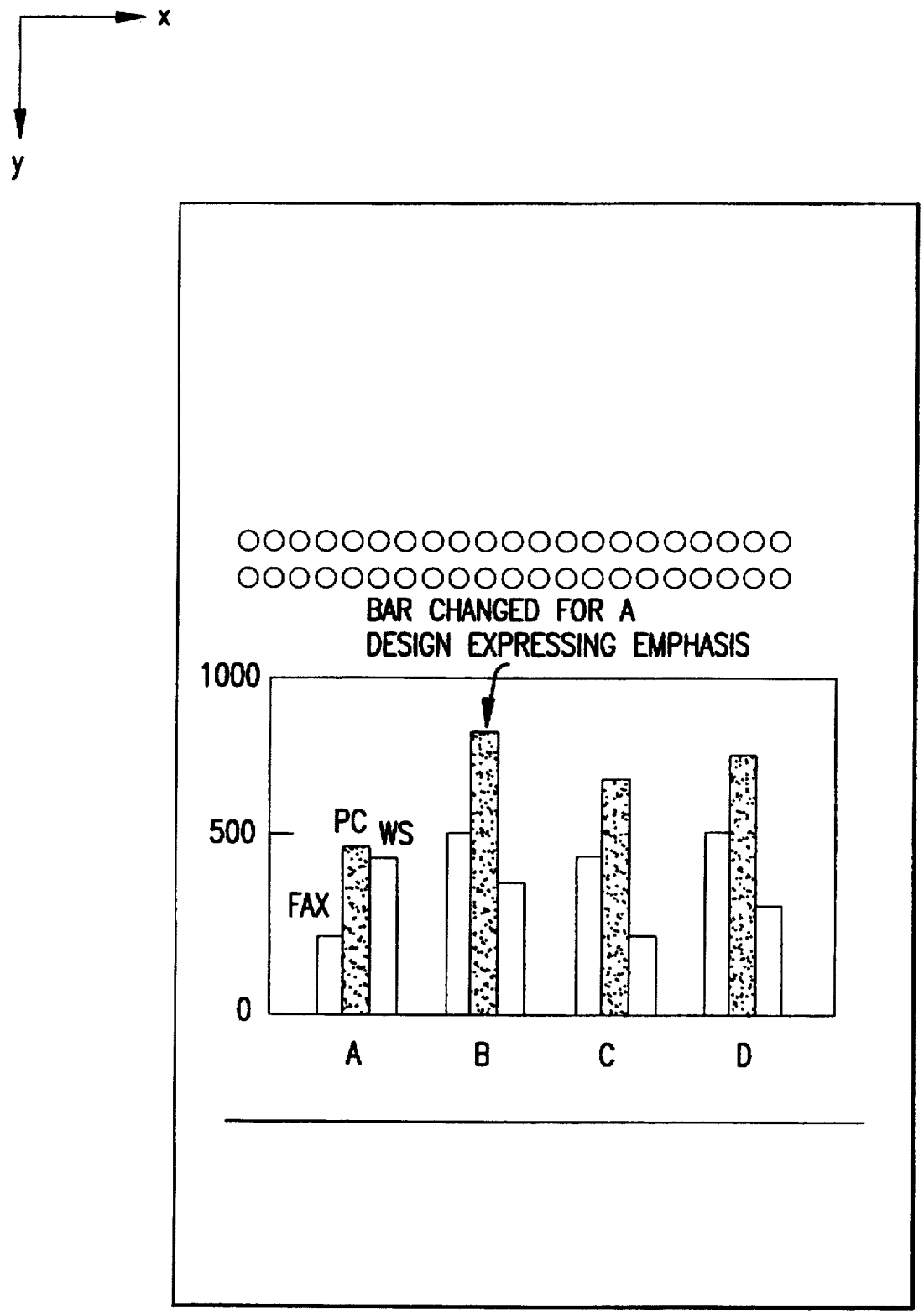
FIG. 13 is an example of an output image emphasizing "bar 2" of a histogram.
Figure 14:
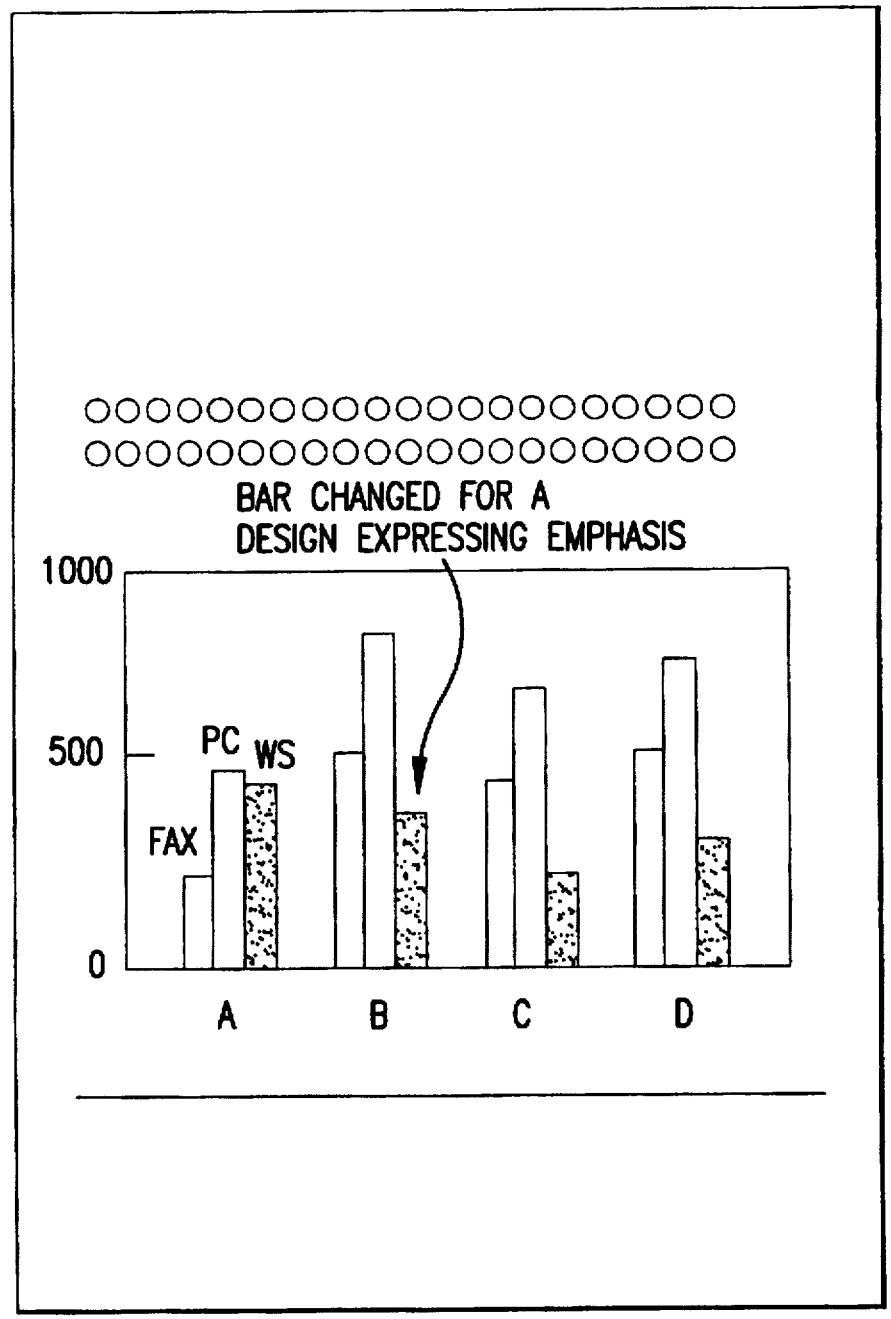
FIG. 14 is an example of an output image emphasizing "bar 3" of a histogram.

A button 61 for "collective processing" is provided on an operation panel as shown in FIG. 6A. When the button 61 is pushed, the design changing function in this embodiment is started. Then, types of design change 63 are displayed as shown in FIG. 6A, and a user selects a desired type of design change among them. In the embodiment, "partial emphasis" and "partial extraction" are provided for the types of design change. "Partial emphasis" is a processing for preparing a plurality of documents, each of which has a emphasized portion different from each other. For instance, FIG. 12 to FIG. 14 show three documents in which different portions of a histogram, namely, one of "bar 1", "bar 2" and "bar 3" of a histogram is emphasized. Further, "partial extraction" is a processing for preparing a plurality of documents in which different portions, such as elements constituting a graph or a table, are extracted from an original document. For instance, in a case of a table, a plurality of documents, which have different columns (or rows) extracted, are generated, such as a first document having a first column extracted from the table, a second document having a second column extracted the table, and so on.

(Original Inputting Module 21)

Original inputting module 21 acts just as an image scanner, irradiates, by a light source, an elongate region in the first scanning direction while moving a read portion comprising a light source and an image sensor in the second scanning direction, converges the reflected light by a lens, converts it into electric signals by a device such as a CCD image sensor and inputs them as binary digital images into an input image memory 211. This can be realized by a conventional art. It is also possible to input the intensity of the reflected light as multi-value images through an AD converter and binarize them by digital image processing.

(Graph/Table Region Extracting Module 22)

Graph/table region extracting module 22 extracts a region of a graph or a table from document image including characters, graphics and others which have been inputted by the original inputting module 21. This processing corresponds to a region divisional processing in a document recognizing art, and can be realized by a conventional art.

In this processing, the inputted image is divided, for example, into character regions, graphic regions and graph and table regions, and the partial image of the graph and table regions is outputted. Before this processing, It is possible to carry out a preprocessing such as a skew correction or a noise removal.

(Graph/Table Structure Recognizing Module 23)

Graph/table structure recognizing module 23 receives partial image of the graph and the table region outputted by the graph/table region extracting module 22, divides the inside of the region into elements such as characters, line segments and closed regions, determines the positional relation and association among the elements in accordance with kinds and coordinate values of the elements and identifies which part of the graph or the table each element acts, namely determines a element type of each element. This is realized by a conventional art.

Figure 4:
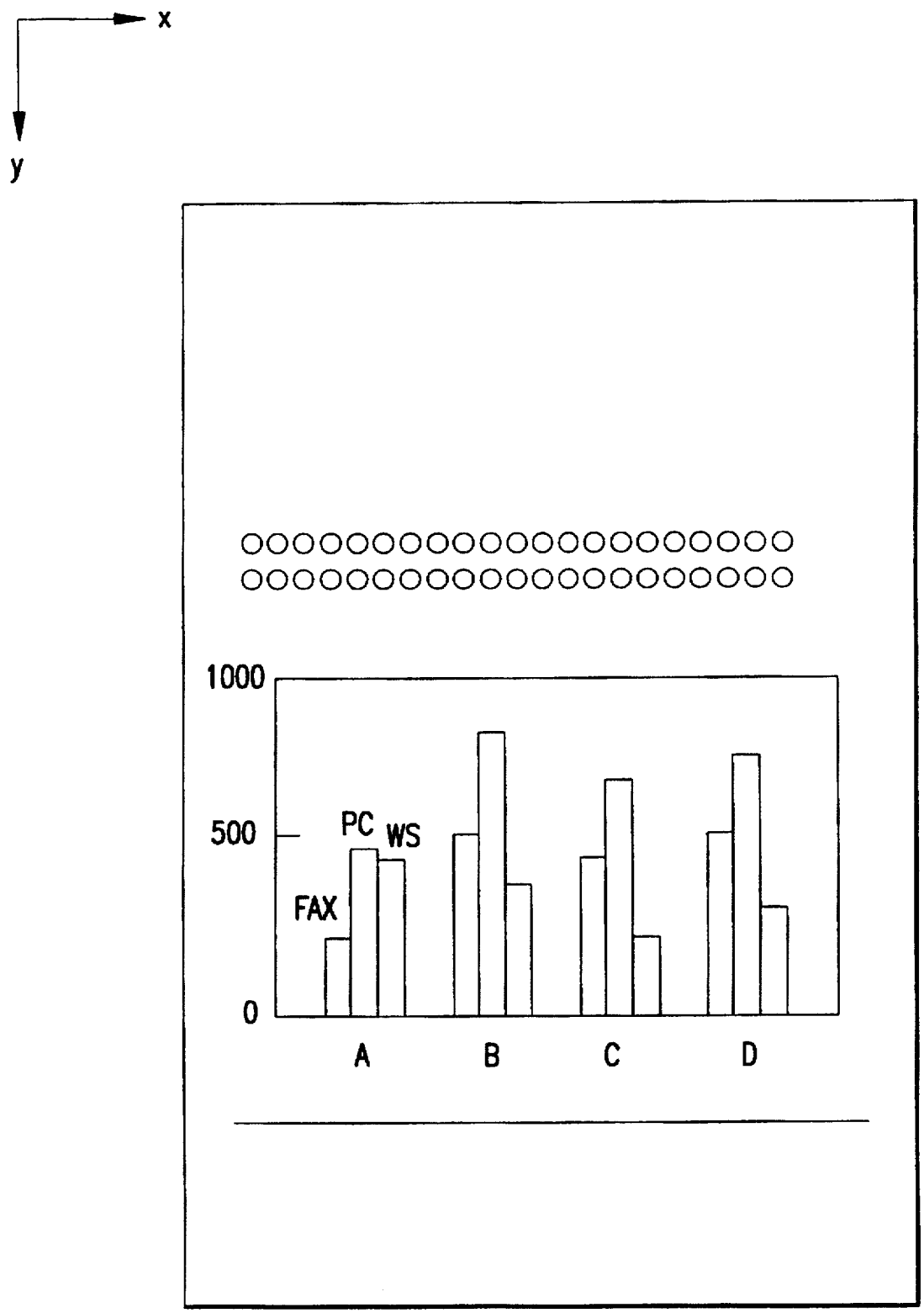
FIG. 4 is an example of an input document including a histogram.
Figure 6B:
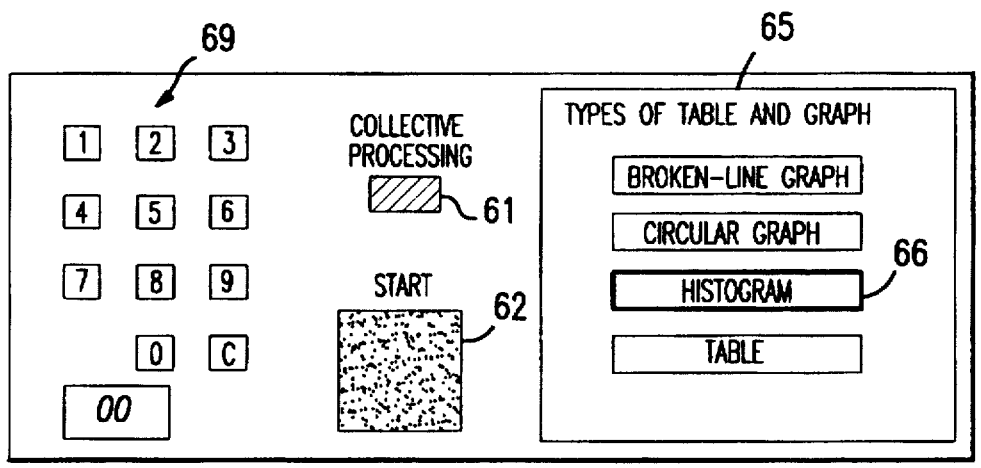
FIG. 6B is an example of operation panel for selecting the type of graph and table.

Assuming, for instance, that a document including a histogram as shown in FIG. 4 is inputted. In a selection screen displaying candidates for the types of the graph and the table on an operation panel as shown in FIG. 6B, when "histogram" 66 is selected, a structure of a histogram of an inputted document is recognized. In this histogram, for example, each three of bars constitute a group. The bars in each of the groups are identified for the element type from the left as: "bar 1", "bar 2" and "bar 3", respectively. FIG. 9 shows an example of the structure data of the histogram recognized here. FIG. 10 is another example of a structure data of a table. FIG. 9 and FIG. 10 are described in detail later.

(Design Change Portion Determining Module 24)

Design change portion determining module 24 determines a portion to be changed for design in accordance with the data of the graph and the table which is recognized for the structure by the graph/table structure recongizing module 23. For instance, when the type of the graph and the table is a "histogram" and the type of the design change is the "partial emphasis", bars of histogram are considered as candidates for the design change portion. Since the number of bars in a group is three, that is the element types of bars includes "bar 1", "bar 2" and "bar 3", different portions are determined as the portion to be changed for design three times. The first time is for the "bar 1" and then are for "bar 2" and "bar 3" determined as design change portions successively. It is automatically determined by predetermined rules.

Further, the design change portion determining module 24 can also be constituted so as to determine the change portion in accordance with an instruction from a user, in which the design change portion is determined in accordance with information from the design change portion instructing module 25 described in following.

(Design Change Portion Instructing Module 25)

Design change portion instructing module 25 is not used in the first embodiment, because the portion to be changed for design is automatically determined. Although this is a module necessary in the second embodiment and the third embodiment to be described later, this is explained here. For instance, it has a user's interface such as a menu screen for an editor to instruct the element types of elements constituting the graph and the table intended for design change and a restriction range thereof. The content of the instruction is sent to the design change portion determining module 24.

Figure 5:
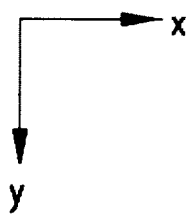
FIG. 5 is an example of a n input document including a table.
Figure 5:
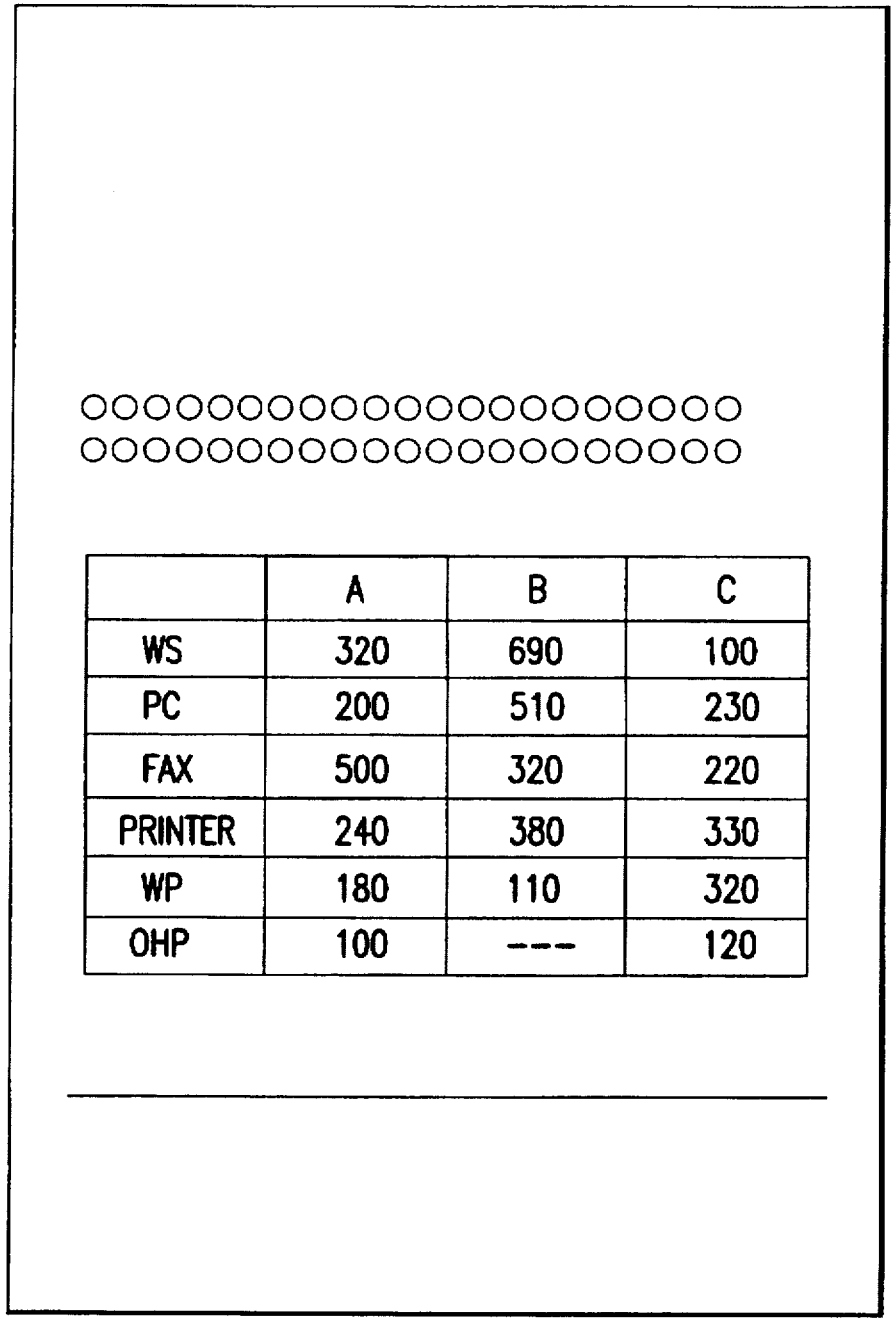
Figure 6C:
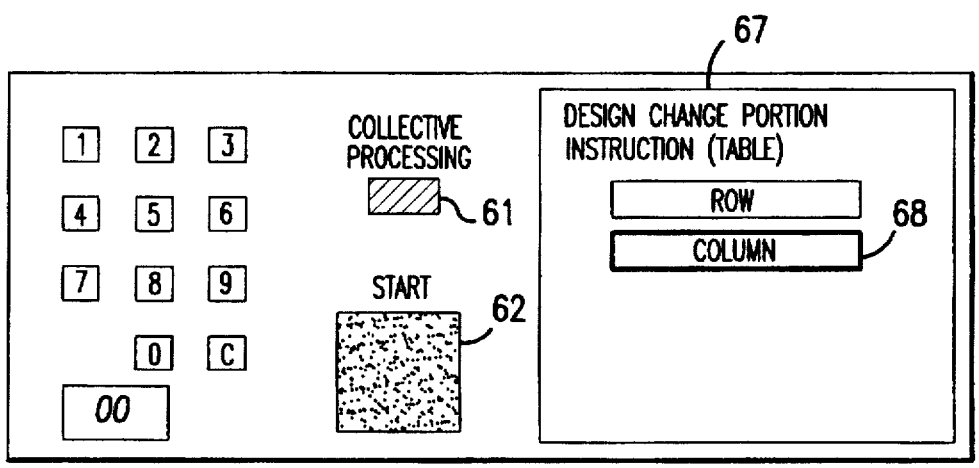
FIG. 6C is an example of an operation panel for selecting the type of portion to be changed for design.

For instance, it is assumed that a document including a table as shown in FIG. 5 is inputted. In the case of table, since "rows" and "columns" are considered as the portions to be changed for design, one of "rows" and "columns" displaying on a menu screen 65 as shown in FIG. 6C, is selected. If "column" is selected here for instance, it is sent to the design change portion determining module 24, and the design change portion determining module 24 carries out the processing in accordance therewith.

Further, in a case of emphasizing "column", it is possible to limit the range of the columns to be emphasized by giving an instruction, for example, "from third column to fourth column". In this instance, the number of different emphasized portions is two and two different documents are prepared. The instruction representing columns for starting and for ending to emphasize may be indicated, for example, by a ten key 69 by a number such as "3, 4" or may be instructed by the coordinate on the document using a digitizer or the like.

Figure 7A:
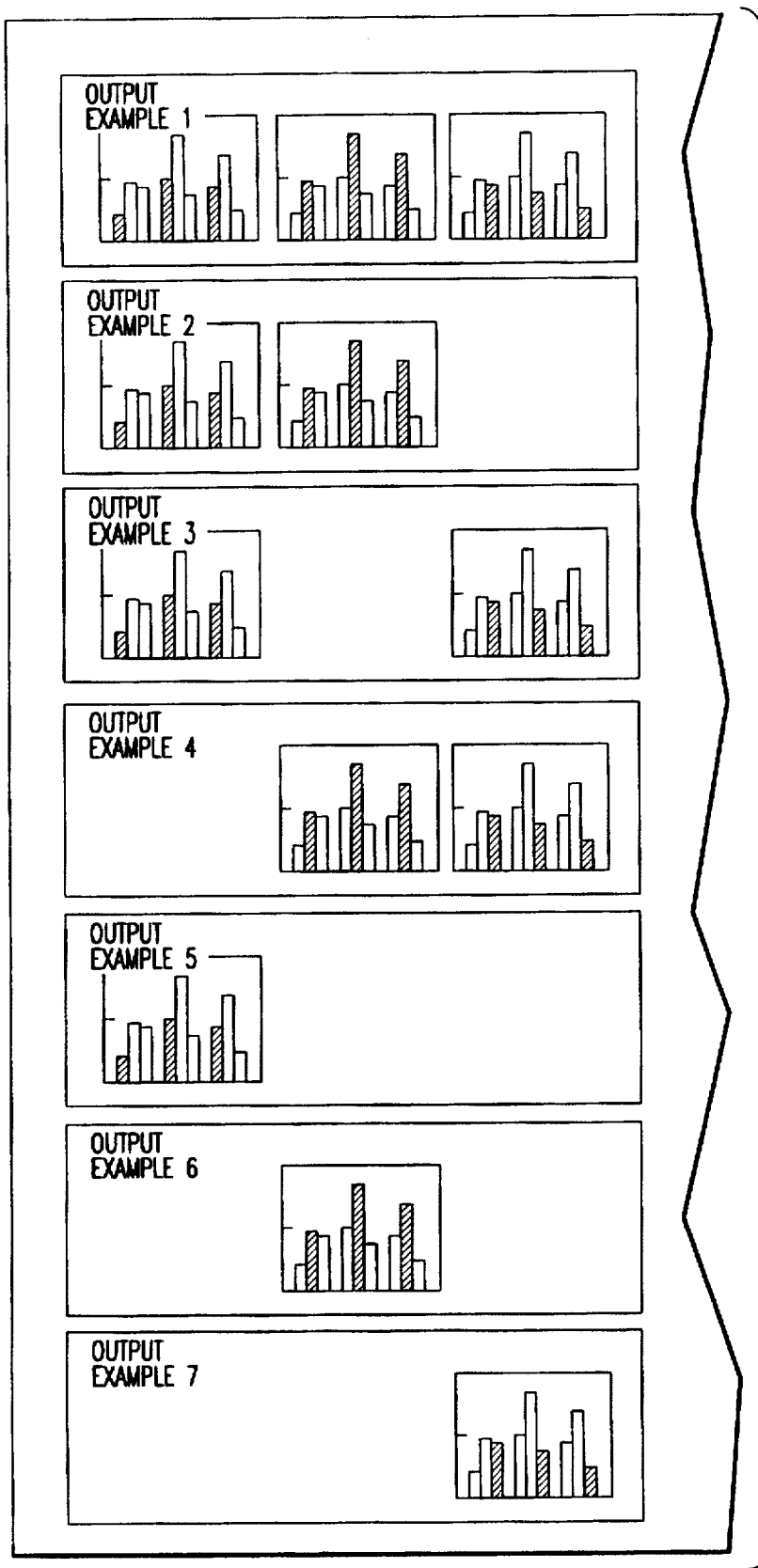
FIGS. 7A and 7B are a screen displaying all the candidates for selecting the kind of design change and the portion to be changed for design in the second embodiment simultaneously.
Figure 7B:
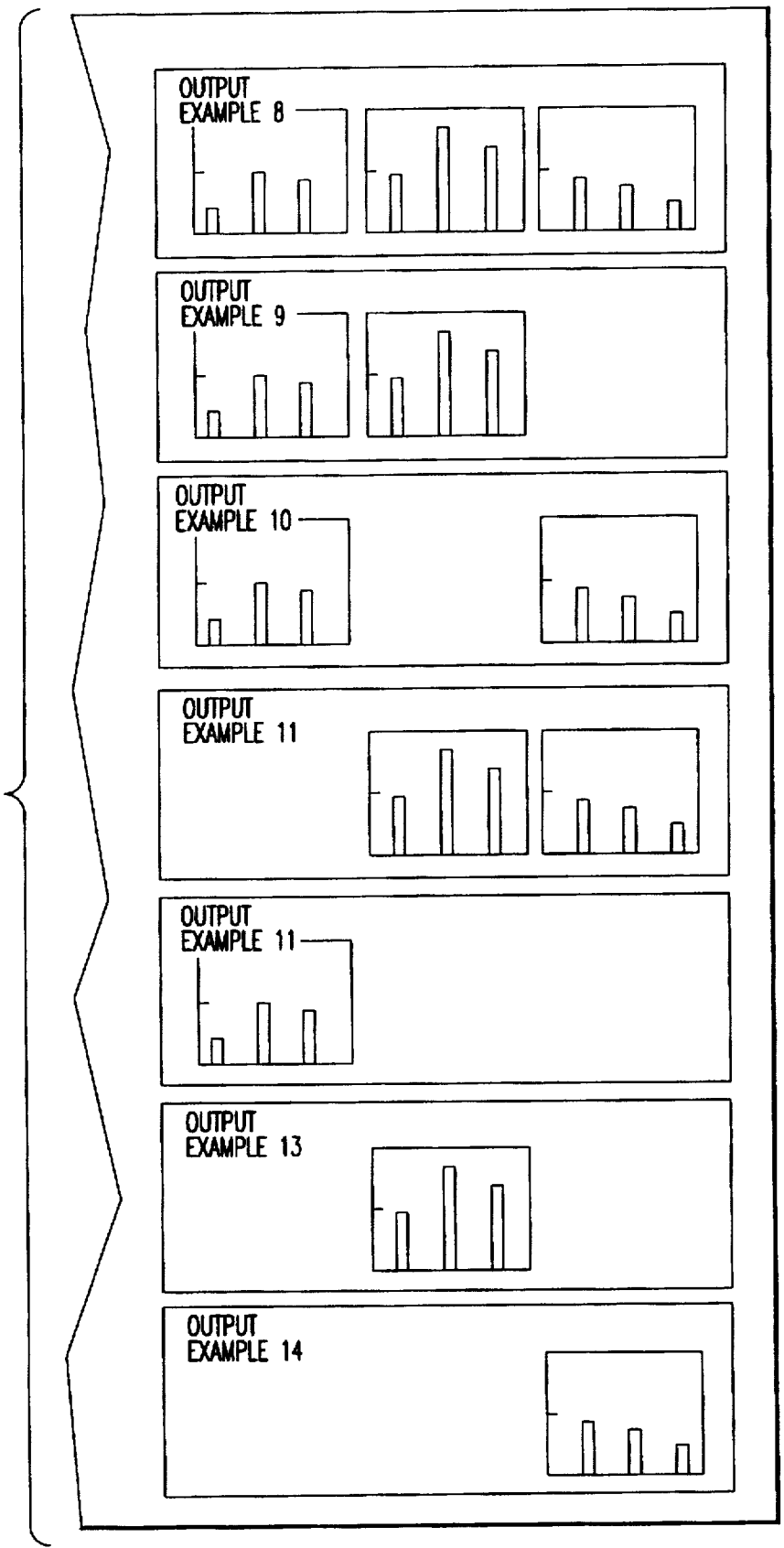

Further, it is also possible to provide the user interface for simultaneously selecting the design change portion and the type of the design change as explained above for the design change instruction inputting module 20. In this instance, as shown in FIGS. 7A and 7B, all the candidates for the combinations of the types of the design change and the patterns of design change portions are displayed. In an example of the candidates in a case of the histogram shown in FIGS. 7A and 7B, fourteen candidates for output patterns are displayed. The candidates from no.1 to no.7 on the left concern the instruction for the "partial emphasis" as the type of the design change, while the candidates from no.8 to no.14 on the right concern the instruction of the "partial extraction". Each of the candidates displays a set of part of documents for one of the types of the design change to be prepared. A user can simultaneously indicate the type of the design change and the design change portion by selecting one of the candidates among them. For example, when a user selects the candidate no.2, two documents are prepared, which are emphasized for the first bar and the second bar in the graph, respectively. In this manner, this user interface includes the part of the function of the design change instruction inputting module 20.

Figure 8:
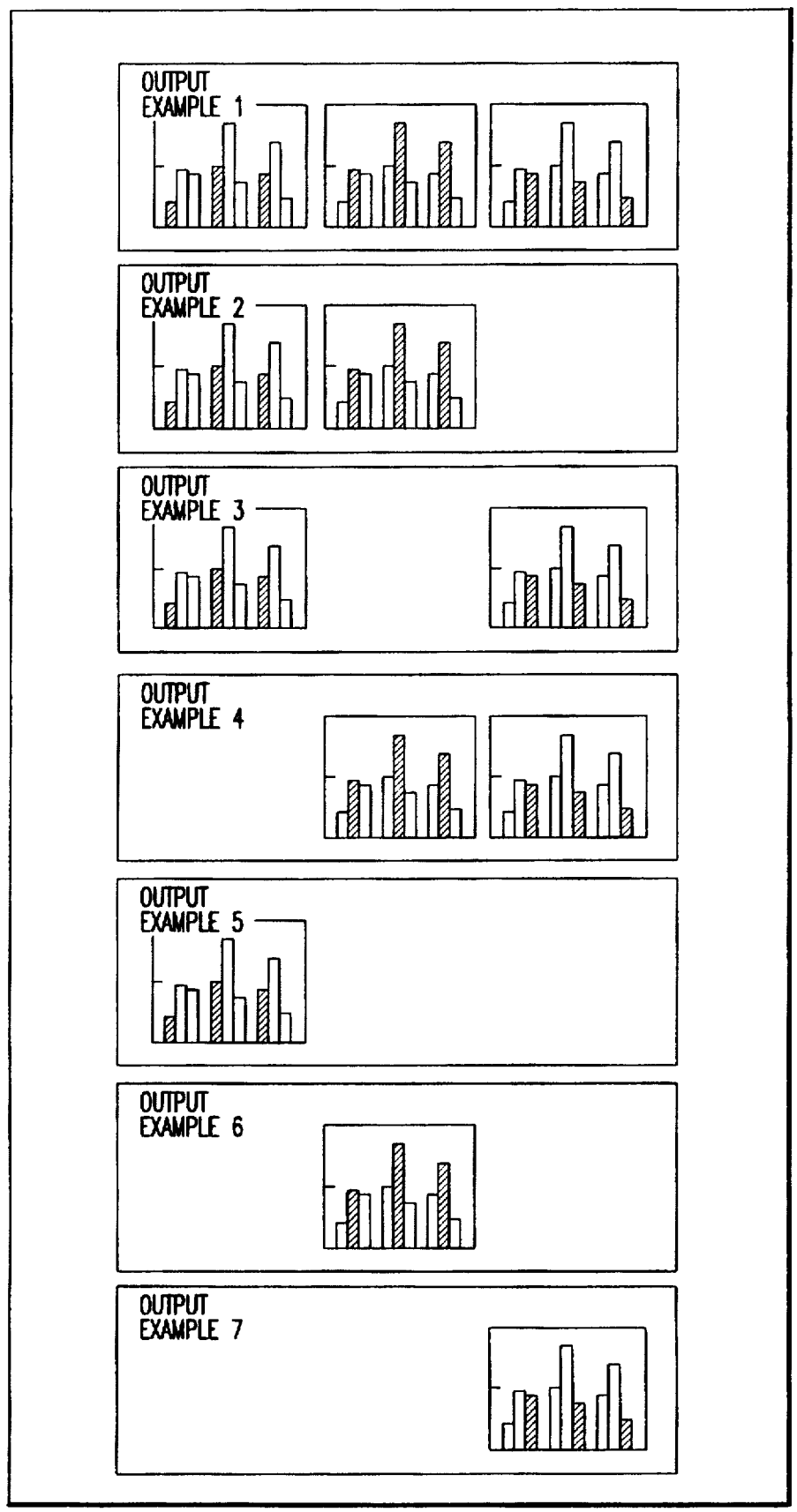
FIG. 8 is a screen displaying all the candidates for selecting the portion to be changed for design in the third embodiment.

Further, as shown in FIG. 8, it is also possible to provide a user interface for displaying all the candidates concerning the portion to be changed for design corresponding to the type of the design change instructed by the design change instruction inputting module 20 (assuming partial emphasis is instructed here), and a user selectively instructs the change portion among them.

(Element Property Providing Module 26)

The element property providing module 26 provides an element property of the design change each for once to the constituent elements on the graph and the table corresponding to the change portion determined by the design change portion determining module 24.

In a case of "histogram", since "bar 1" is determined as a portion to be changed for design at first, an element property of "emphasis" is provided to all of the elements corresponding to "bar 1" as shown in the structure data expressing the structure of the histogram in FIG. 9. Then, the structure data is sent to output image forming module 27 (described later) to form output documents emphasized for "bar 1". The processing is carried out in the same manner if "bar 2" or "bar 3" is determined as the portion to be changed for design.

In a case of a "table" described above, since "third column" is determined as the design change portion at first, an element property of "emphasis" is provided to all the elements corresponding to "third column", as shown in the structure data representing the structure of the table in FIG. 10 in this instance. Then, the structure data are sent to the output image forming module 27 to form output documents emphasized for "third column". The processing is carried out in the same manner if "fourth column" is determined as the portion to be changed for design.

(Output Image Forming Module 27)

Output image forming module 27 receives the input image from the original image inputting module 21 and the structure data of the graph and the table from the element property providing module 26. The input image is converted in accordance with parameter values determined by coloring parameter determining module 28 (described later) to the elements for which the element property of the design change has been provided. Other elements may also be changed into suitable images in accordance with the logical structure thereof. Output image data is thus formed and sent to print out module 29 (described later).

(Coloring Parameter Determining Module 28)

Coloring parameter determining module 28 determines a table suitable to the inputted document image from a plurality of coloring parameter tables 281.

The coloring parameter tables 281 represent in what color each element of the graph and the table has to put to color. They are stored, for example, in ROM (Read Only Memory). The data stored in the coloring parameter tables 281 are determined based on the various knowledge required for determining the design of documents, and they are for example, quantitative data obtained by methods such as subjective evaluation as described in "7Q7 A Study on Evaluation Scales for Document Design Quality" prepared for the 42th Joho Shori Gakkai (Information Processing Society) National Symposium, 1991, qualitative or quantitative data as described in "Presentation and Documentation", Fuji Xerox Co., Ltd., 1989", or "Business Document no enshutsu giho II" (Technique for making Business Documents Look Better II), Fuji Xerox Co., Ltd. and Coa Dsign Co., Ltd., 1992, or data showing the atreement according to cooperation rules. FIG. 11A is an example of the coloring parameter for a histogram. FIG. 11B is an example of the coloring parameter for a table.

(Print Out Module 29)

Print out module 29 reads the output image data formed by the output image forming module 27 into an output image memory 291, transfers it on paper by using, for example, a laser beam printing technique and then output the paper. In this embodiment, since full color image is outputted, the gradation value information of four colors, that is cyan, magenta, yellow and black are stored for each pixel in the output image memory 291. Although a laser beam printer capable of full color printing is employed here, it is also possible to use a marking technique such as thermal transfer on plain paper in addition to the laser beam. This can be realized by a conventional art.

Figure 15:
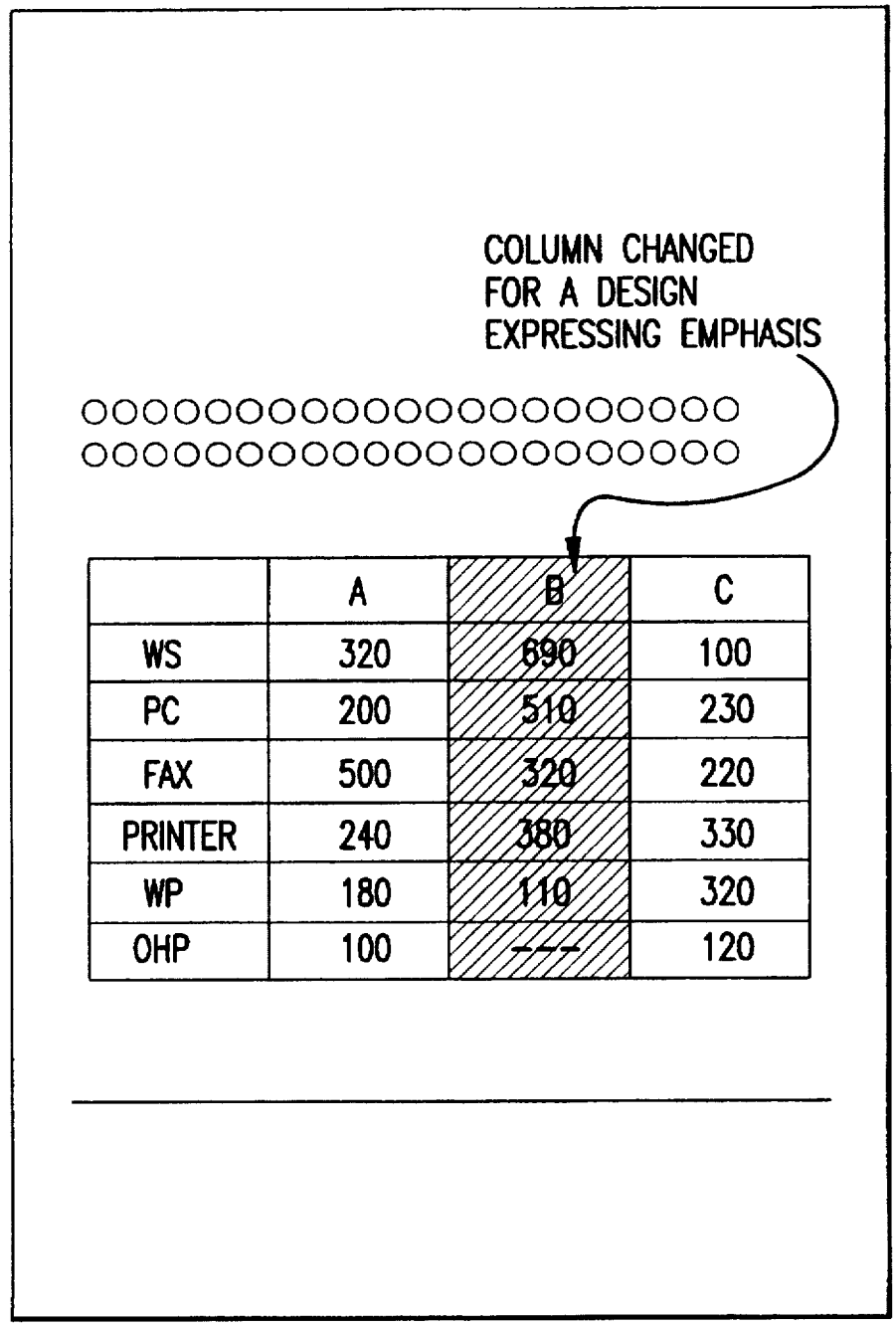
FIG. 15 is an example of an output image emphasizing "column 3" in a table.
Figure 16:
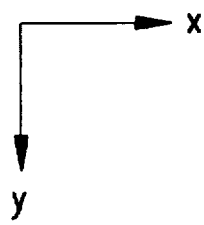
FIG. 16 is an example of an output image emphasizing "column 4" in a table.

In a case of a "histogram", a plurality of documents different in the portions of bars changed to a design expressing emphasis as shown in FIG. 12–FIG. 14 are formed. In a case of an example for a "table", a plurality of documents different in the portions of rows changed to a design for expressing emphasis as shown in FIG. 15–FIG. 16 are prepared.

Figure 3:
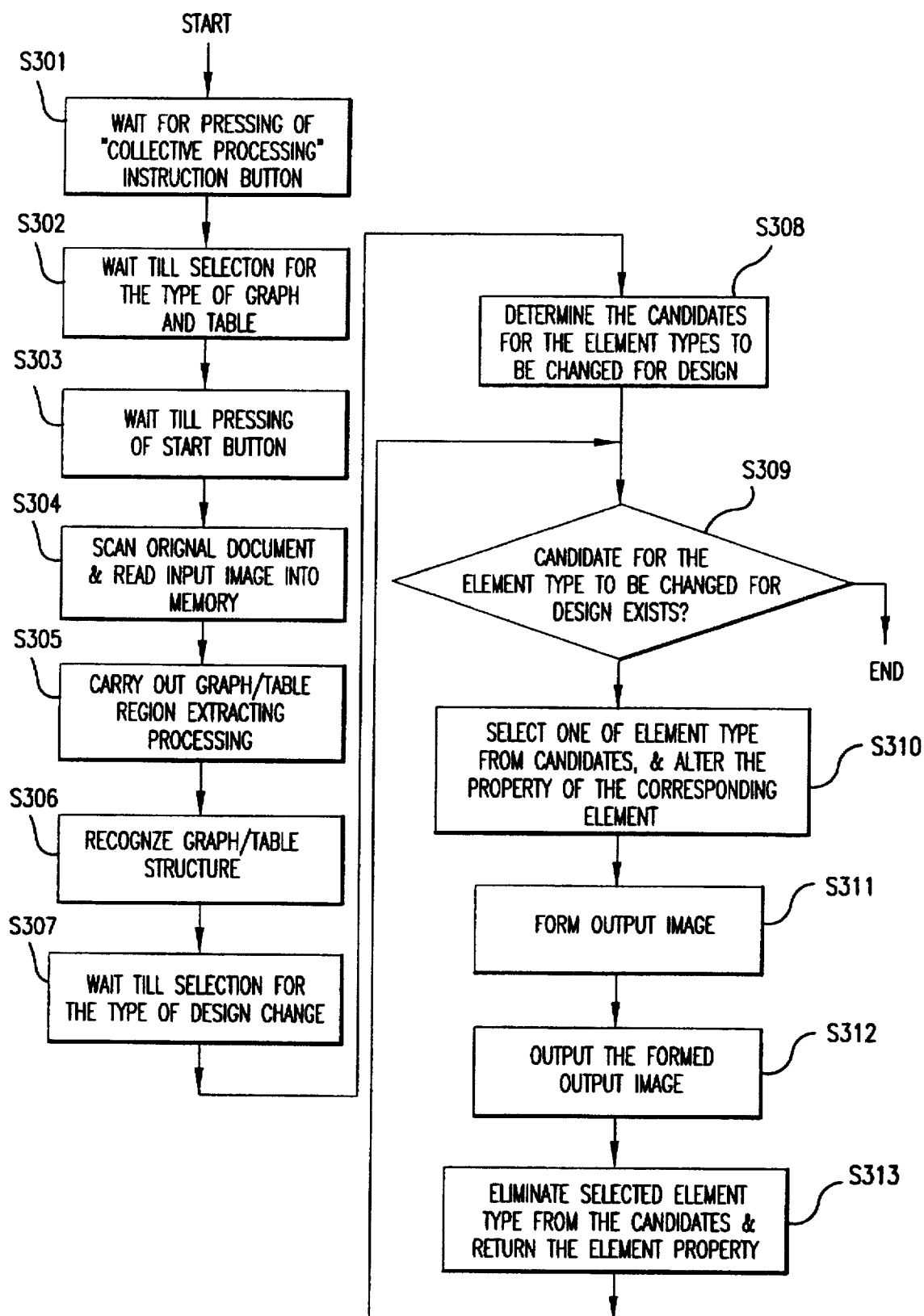
FIG. 3 is a flow chart of processings carried out in the first embodiment.

Description will be made to the operation of the first embodiment structured as described above using a flow chart for the processing shown in FIG. 3. It is assumed hereinafter for the coordinate system that the direction toward the right end of the page is the x coordinate and that directing downwardly to the page is the y direction.

At first, a user puts a document containing a graph or a table as shown in FIG. 4 or FIG. 5 on a platen such as of an image scanner, and selects a button 61 for "collectively processing" on the operation panel as shown in FIG. 6B (step S301). Then, a screen 65 for selecting the type of the graph and the table shown in FIG. 6B is displayed on the panel, and the user selects, for example, a button 66 for a "histogram (step S302)". When a start button 62 is pressed in this state (step S303), the original image inputting module 21 starts scanning, to store the image of the original document to the input image memory 211 (step S304)

Then, the graph/table region extracting module 22 starts processing (step S305). In this processing, it at first divides the input image into a plurality of regions. Then, it takes out the divided regions one by one, judges whether the taken-out region is a graph and a table or not and, if it is a graph and a table, the image of the region is outputted to the graph/table structure recognizing module 23. After the processing has been completed for all the regions, the image only for the graph and table region are extracted and outputted to the graph and table structure recognizing module 23.

Then, the graph/table structure recognizing module 23 carries out the graph/table structure recognizing processing to the graph and table region image to form a structure data of a graph and a table (step S306). Namely, it receives the partial image of the graph and the table region outputted by the graph/table extracting module 22 as an input, divides the inside into element s such as characters, line segments and closed regions, and so on, judges the positional relation and association for each of the elements, based on the kinds and coordinate values for the elements and determines what element type in the type of the graph and the table selected in step S302 corresponds to.

Further, the coordinate values are extracted. The structure data in a case where the graph and the table is histogram includes "element number", "element type" and "coordinate value" as shown in FIG. 9. The coordinate value is represented by a set of coordinates at the point expressing the feature on every the element type.

Then, the type of the design change is designated by a user to the graph and the table recognized for the structure by the graph/table recognizing module 23. For this purpose, a selection screen 63 for the types of the design change (collective processing) is displayed as shown in FIG. 6A to wait for user's selection (step S307). When user's selection is inputted, the result of the selection is handed to the design change portion determining module 24.

The design change portion determining module 24 determines candidates for the element types to be changed for design (step S308). For instance, in a case where the type of the graph and the table is the histogram, the candidates for the the element types to be changed are determined as "bar 1", "bar 2" and "bar 3".

The element property providing module 26 receives information of the candidates for the element types from the design change portion determining module 24. Then, one element type is selected from the candidates for the element types and the property of the corresponding element is changed (step S310). For instance, FIG. 9 shows an example of the structure data of the the histogram including "element number", "element type" and "coordinate value" recognized by the graph and table structure recognizing module 23. A field of "element property" is also provided and "emphasis" is set to the field of "element property" corresponding to "bar 1" as one of the element type selected from the candidates for the element types. FIG. 10 shows an example of structure data for the table including "row number", "column number", "coordinate for upper left point x", "coordinate for upper left point y", "coordinate for lower left point x" and "coordinate for lower left point y", for the cell of the table recognized by the graph/table structure recognizing module 23. In this case, "row number" and "column number" are used to specify the element type. A field of "element property" is provided and a property of "emphasis" is set to the field of "element property" corresponding to one of the element types "column number 3" selected from the candidates for the element types.

The output image forming module 27 receives the input document image and the structure data of the graph and the table provided with the element property and, referring to the coloring parameters as shown in FIG. 11A or 11B regarding coloration of graphs or tables stored previously in ROM, converts the partial image along with instruction of the coloring parameter corresponding to the type of element and the element property in the structure data. In the case of histogram, under the coloring parameter shown as FIG. 11A, the elements are colored in cyan 45%, magenta 15%, yellow 15% and black 0% if the element type for each of the graph elements is "bar 1" or cyan 45%, magenta 45%, yellow 15% and black 0% if the element type is "bar 2". Further, it converts the partial image by replacing with a coloring parameter for emphasis as: cyan 50%, magenta 60%, yellow 10% and black 0% if the element property is "emphasis". In the case of the table, the cells with the property of "emphasis" are colored in cyan 10%, magenta 30%, yellow 25% and black 0%, and others are cyan 20%, magenta 15%, yellow 0% and black 0% in accordance with the coloring parameter shown as FIG. 11B (step S311).

In this way, the document image data of the graph and the table in which one element type selected from the candidates for the element types is set to the color corresponding to the element property in accordance with the coloring parameters is transferred to the output image memory 291 of the print out module 29.

The output image in which one element type selected from the formed candidates is determined for coloring in accordance with the element property such as "emphasis" is visualized, for example, on plain paper by the print out module 29 using a usual full color image output process and then recorded and displayed as shown in FIG. 12 (step S312)

When the recording and display have been completed, the selected element type is deleted from the candidates, and the element property is returned to the original state (step S313). For instance, when the recording and display of the document image in which the element type of "bar 1" is emphasized, setting for "emphasis" corresponding to "bar 1" in the field of the element property in the graph structure data of the histogram shown in FIG. 9 is eliminated.

Then, it is examined whether the candidate for the element type to be changed for design still remains or not (step S309) and, if it remains, the next element type is selected from the candidates and the element property of the corresponding element type is changed to execute the steps from S311 to S313. The processing continues as far as such candidate for the element type is present and terminates when no candidate is present.

At the instance of completion, a plurality of documents are obtained, in which different portions are changed for design expressing, for example, emphasis. For instance, in a case of a histogram, documents in each of which the "bar 1", the "bar 2" and the "bar 3" are changed to a design expressing emphasis as shown in FIG. 12, FIG. 13 and FIG. 14 respectively are obtained.

In accordance with the first embodiment described above in details, a user can automatically form a plurality of documents in which different bars of a histogram or different columns of a table are emphasized or extracted under coloration of adequate coloring by a simple design change instruction such as "partial emphasis" or "partial extraction".

(Embodiment 2)

The second embodiment is different from the first embodiment in view of the constitution and the operation of the design change portion determining means 12. Namely, the design change portion is automatically determined without user's instruction in the first embodiment, whereas the design change portion instructing module 25 is disposed in the second embodiment such that a user can instruct. The design change portion instructing module 25 is as has been described in relation with the explanation for the first embodiment.

Figure 17:
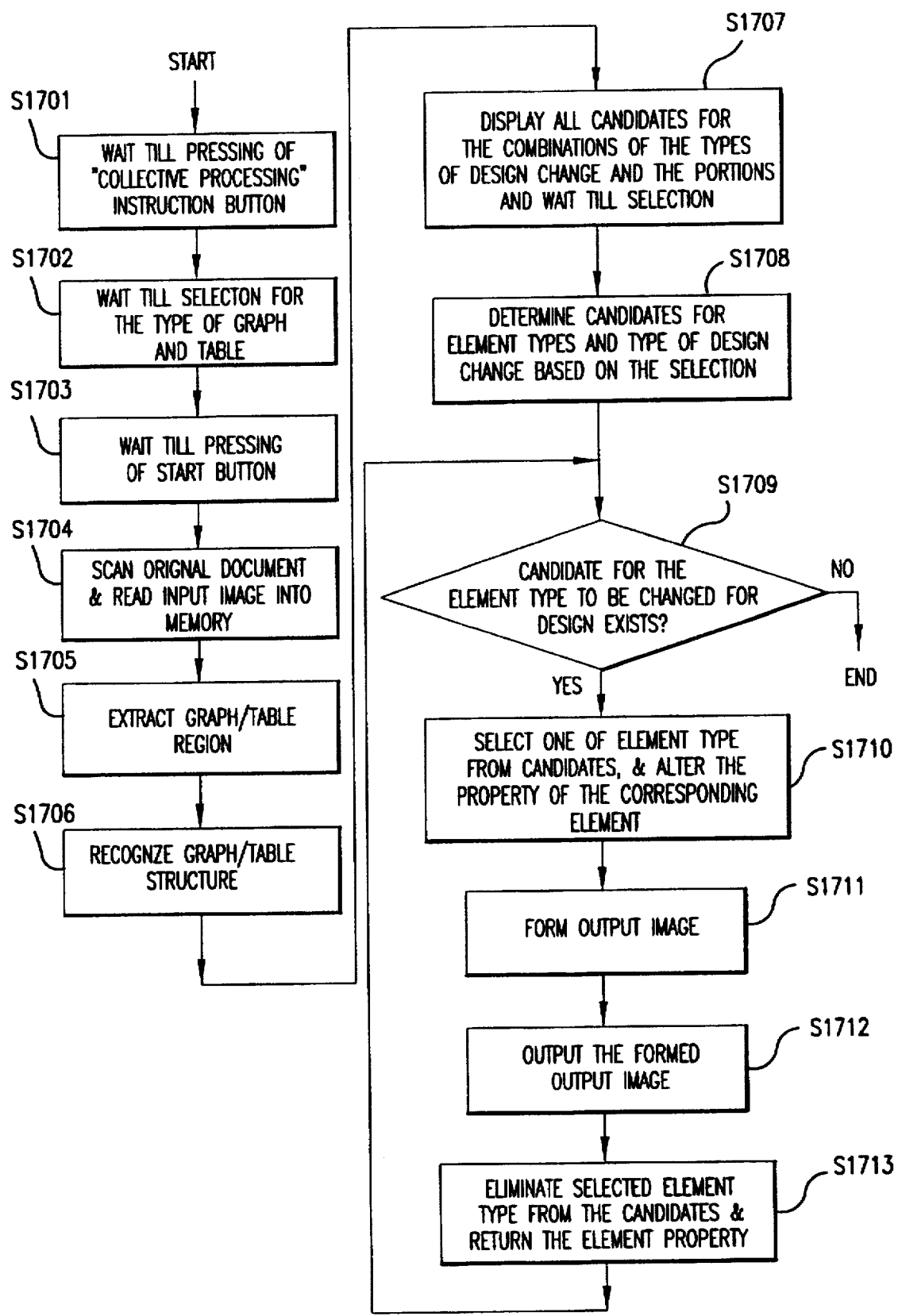
FIG. 17 is a flow chart of the processes carried out in the second embodiment.

FIG. 17 is a flow chart illustrating the operation of the second embodiment. It is generally identical with the operation flow chart of the first embodiment shown in FIG. 3. Namely, steps S301–S303, as well as steps S309–S313 in FIG. 3 correspond to and equal with steps S1701–S1706 and steps S1709–S1713 in FIG. 17 respectively. The step S1707 and the step S1708 are different from the corresponding portions in the first embodiment. Explanation will be made only to the different portion.

After the completion of the processing in the steps S1701–S1706, a user's instruction is simultaneously given to the type of design change and the portion to be changed for design. For this purpose, all candidates for the combinations of the possible types of the design change and the patterns of portions to be changed are displayed as shown in FIG. 7 and it waits till user's selection (step S1707). When the selection is inputted by the user, the result of selection is handed to the design change portion determining module 24.

The design change portion determining module 24 determines, based on the result of selection, candidates for the type of design change and the element type to be changed for design (step S308). For instance, in a case if the uppermost left icon "output example 1" is selected by the user, the type of the design change is determined as emphasis and the candidates for the element types are determined as "bar 1", "bar 2" and "bar 3".

Subsequently, processings for steps S1709–S1713 which are the identical processing with the steps S309–S313 in the first example are carried out.

According to this embodiment, all the candidates of the instruction for the combinations of the design change instruction and the instructions for selecting the portion to be changed are presented in the form of the icon easy to understand by the user, and the user can input a necessary instruction merely by indicating them by an input device such as a mouse, so that instruction operation is simple and user interface is excellent.

(Embodiment 3)

The third embodiment is different from the first embodiment in view of the constitution and the operation of the design change portion determining means 12. Namely, the portion to be changed for design is automatically determined with no user's instruction in the first embodiment, whereas the design change portion instructing module 25 is disposed in the third embodiment in the same manner as in the second embodiment, so that a user can instruct. The design change portion instructing module 25 has already been mentioned in relation with explanation for the first embodiment.

Figure 18:
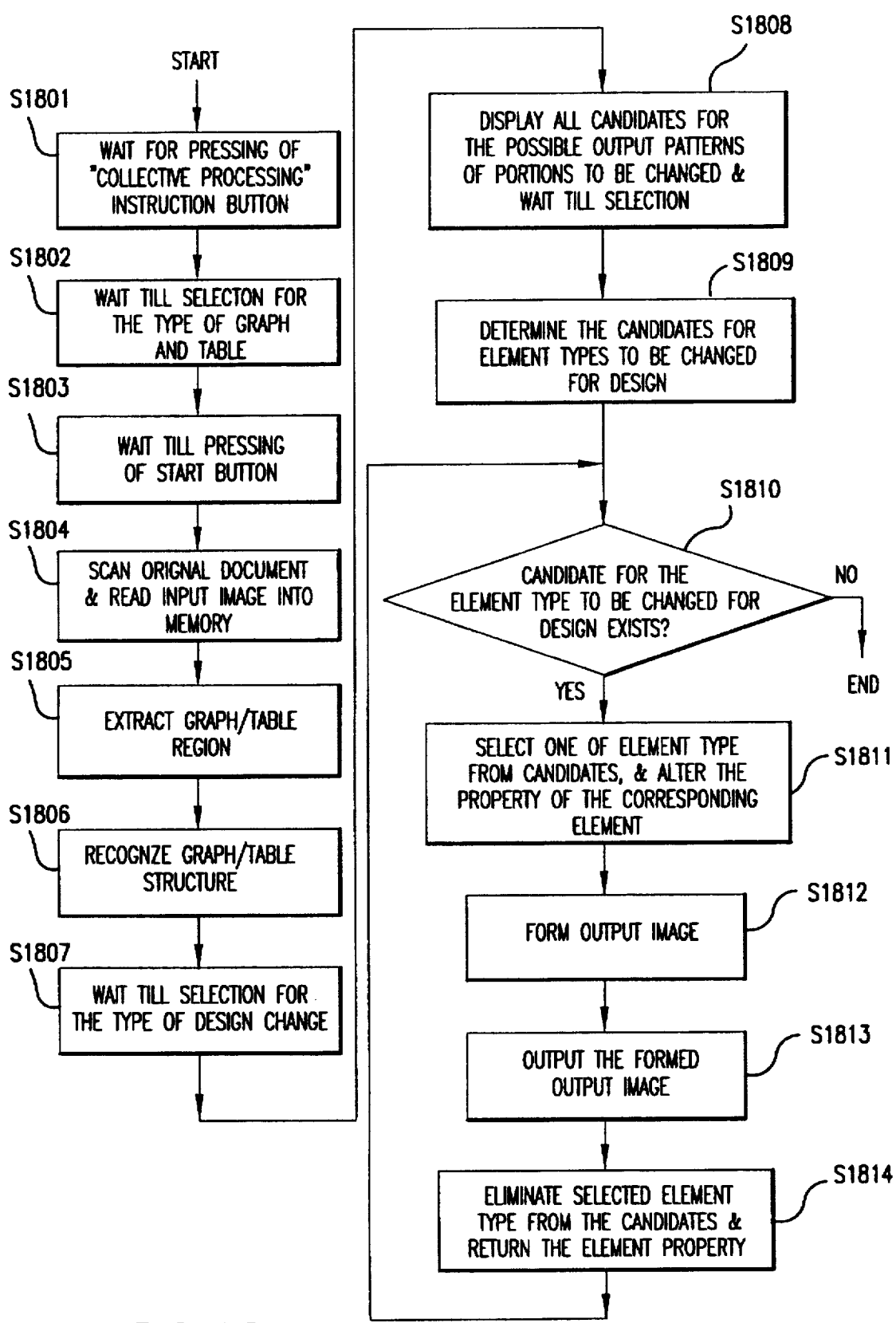
FIG. 18 is a flow chart of the processes carried out in the third embodiment.

FIG. 18 is a flow chart illustrating the operation in the third embodiment. It is generally identical with the operation flow chart of the first embodiment shown in FIG. 3. That is, the step S301–S307, as well as the step S308–S313 in FIG. 3 correspond to and equal with the step S1801–S1807, as well as the step S1809–step S1814 in FIG. 3. It is different in that step S1808 lacks in the corresponding portion in the first embodiment. Explanation will be made mainly on the different portion.

After the completion of the processings for the steps S1801–S1807, a user gives an instruction for the portion to be changed for design to the graph and the table recognized for the structure by the graph/table structure recognizing module 23. For this purpose, all the candidates for the output patterns for the portions to be changed for the selected type of design change in step S1807 are displayed as shown in FIG. 8, and it waits till user's selection (step S1808). When a user inputs the selection, the result of the selection is handed to the design change portion determining module 24.

The design change portion determining module 24, based on the result of selection, determines candidates for the element type to be changed for design (step S1809). For instance, if a third icon "output example 3" in FIG. 8 is selected by the user, candidates for the element type are determined as "bar 1" and "bar 3".

Subsequently, processings for steps S1810–S1814 which are identical with the processing for steps S309–S313 in the first embodiment are carried out.

(Embodiment 4)

From the first to the third embodiment, the present invention is applied to a copying machine but it is also applicable to a document editing apparatus such as a word processor by adopting a constitution as shown in FIG. 19. That is, the document editing apparatus of this fourth embodiment shown in FIG. 19 comprises, generally, an input section A having a keyboard, a display, a mouse, etc. , a processing section B having a CPU, a memory, etc. , and an output section C such as a printer. In view of the function, the input section A comprises a design change instruction inputting module 191, a design change portion determining module 192, a design change portion instructing module 193 and a display module 194. The processing section B comprises an original document accumulating module 195, a element property providing module 196, an output image forming module 197, a coloring parameter determining module 198 and an output document accumulating module 199. The output section C comprises a print out module 190. The display module 194 is for the display of candidates, etc. for a user to input. The original document accumulating module 195 including an original document memory is for accumulating data of original documents formed by the document editing function (not illustrated here). Since the structure data of the document is specified, a module for recognizing the document structure such as the graph/table recongizing module 23 in other embodiments is not necessary. The output document accumulating module 199 including a output document memory is for accumulating the output documents. Although the modules have the identical functions with those of the modules carrying identical names in other examples, design change portion determining module 192 and output image forming module 197 receive the structure data of the document from the document accumulating module 199 instead of the graph/table recongizing module 23 or the original image inputting module 21 in the other embodiment. Usual constitutions for the document editing apparatus are not illustrated.

According to the present invention, a plurality of documents in which different portions are changed for design expressing by the designated property, for example, emphasis or extraction, with respect to elements of a graph and a table in the documents can be formed automatically in accordance with the data structure of the document by simple operation. This can save user's labors of preparing a plurality of similar documents, and the operation is simplified to decrease misoperation upon edition. Further, operation and sources for administrating similar documents are no more necessary by possessing only the original document.

What is claimed is:

1. A document processing apparatus comprising:
design change instruction inputting means for inputting a design change instruction to generate a plurality of documents having different design;
design change portion determining means for determining a different portion to be changed for design in each of the plurality of documents to be generated; and
document generating means for generating the plurality of documents each of which has a different changed portion for design in accordance with the design change instruction inputted by said design change instruction inputting means and the different portion of the document determined by said design change portion determining means.

2. A document processing apparatus as defined in claim 1, further comprising:

change portion instruction inputting means for inputting a change portion instruction for indicating the portion to be changed for design from a user, and wherein said design change portion determining means determines the different portion in accordance with the change portion instruction inputted by said change portion inputting means.

3. A document processing apparatus as defined in claim 2, further comprising:

a user interface for displaying candidates for the possible patterns of portions to be changed of the plurality of generating documents related to the design change instruction inputted by said design change instruction inputting means, and for selecting one of the displayed candidates.

4. A document processing apparatus as defined in claim 1, wherein the design change instruction is a partial emphasis instruction for emphasizing a portion of the document.

5. A document processing apparatus as defined in claim 1, wherein the design change instruction is a partial extraction instruction for extracting a portion of the document.

6. A document processing apparatus as defined in claim 1, further comprising:

document storing means for storing a document including a set of document components;

wherein said change portion determining means determines at least one of the document components stored in said document storing means as the different portion to be changed; and wherein said document generating means changes for design of at least one of the components determined by said change portion determining means so as to generate the plurality of documents in corresponding with the document stored in said document storing means, each of which includes at least one of the different document components changed for design.

7. A document processing apparatus as defined in claim 6, wherein said document storing means stores a set of elements for constructing a graph as the document components;

wherein said change portion determining means determines at least one of the elements as the different portion to be changed; and wherein said document generating means changes for design of at least one of the elements determined by said change portion determining means so as to generate the plurality of documents in corresponding with the document stored in said document storing means, each of which has at least one of the different elements changed for design.

8. A document processing apparatus as defined in claim 6, wherein said document storing means stores a set of cells for constructing a table as the document components;

wherein said change portion determining means determines cells as the different portion to be changed; and wherein said document generating means changes for design of cells determined by said change portion determining means so as to generate the plurarity of documents in corresponding with the document stored in said document storing means, each of which has the different cells changed for design.

9. A document processing apparatus as defined in claim 1, further comprising:

document structure storing means for storing structure data of a document;

wherein said change portion determining means determines the portion to be changed for design in accordance with the structure data stored by said document structure storing means.

10. A document processing apparatus as defined in claim 9, wherein the structure data of a document stored in said document structure storing means includes a set of components and a type for each of the components;

wherein said change portion determining means determines the type in accordance with the structure data stored in said document structure storing means so as to determines the portion to be changed for design; and wherein said document generating means changes the design of the component corresponding to the type determined by said change portion determining means so as to generate the plurality of document.

11. A document processing apparatus comprising:

document change requiring instruction inputting means for inputting a document change requiring instruction to start generating a plurality of documents having different design;

design change determining means for determining a design for changing a document and a different portion to be changed for design in each of the plurality of documents to be generated in accordance with the document change requiring instruction inputted by said document change instruction inputting means; and document generating means for generating the plurality of documents each of which has a different changed portion for design in accordance with the design and the portion of the document determined by said design change determining means.

12. A document processing apparatus as defined in claim 11, further comprising:

design change inputting means for inputting an instruction to select a design for changing the document from a user, change portion inputting means for inputting an instruction to select a portion to be changed for design from a user, and wherein said design change determining means determines the design and the portion in accordance with the instruction of the design inputted by said design change inputting means and instruction of the portion inputted by said change portion inputting means.

13. A document processing apparatus as defined in claim 12, further comprising:

a user interface for displaying candidates for possible patterns of combinations of the design and the portions of the plurality of generating documents, and for selecting one from the displayed candidates so as to select the design and the portion.

14. A document processing apparatus as defined in claim 11, wherein the design for changing a document is a partial emphasis instruction for emphasizing a portion of the document.

15. A document processing apparatus as defined in claim 11, wherein the design for changing a document is a partial extraction instruction for extracting a portion of the document.

16. A document processing apparatus as defined in claim 11, further comprising:

document storing means for storing a document including a set of document components;

wherein said design change determining means determines at least one of the document components stored in said document storing means as the different portion to be changed; and wherein said document generating means changes the design of at least one of the components determined by said design change determining means so as to generate the plurarity of documents in corresponding with the document stored in said document storing means, each of which includes at least one of the different document components changed for design.

17. A document processing apparatus as defined in claim 16, wherein said document storing means stores a set of elements for constructing a graph as the document components;

wherein said design change determining means determines at least one of the elements as the different portion to be changed; and wherein said document generating means changes for design of at least one of the elements determined by said design change determining means so as to generate the plurarity of documents in corresponding with the document stored in said document storing means, each of which has at least one of the different elements changed for design.

18. A document processing apparatus as defined in claim 16, wherein said document storing means stores a set of cells for constructing a table as the document components;

wherein said design change determining means determines cells as the different portion to be changed; and wherein said document generating means changes the design of cells determined by said design change determining means so as to generate the plurarity of documents in corresponding with the document stored in said document storing means, each of which has the different cells changed for design.

19. A document processing apparatus as defined in claim 1, further comprising:

document structure storing means for storing structure data of a document;

wherein said design change determining means determines the portion to be changed for design in accordance with the structure data stored by said document structure storing means.

20. A document processing apparatus as defined in claim 19, wherein the structure data of a document stored in said document structure storing means includes a set of components and a type for each of the components;

wherein said design change determining means determines the type in accordance with the structure data stored in said document structure storing means so as to determines the portion to be changed for design; and wherein said document generating means changes the design of the component corresponding to the type determined by said design change determining means so as to generate the plurality of document.

21. A copier comprising:

document image inputting means for inputting an image of a document;

document component recognizing means for recognizing document components of the image of the document inputted by said document image inputting means;

design change instruction inputting means for inputting a design change instruction to generate a plurality of documents having design partly different from each other;

design change portion determining means for determining a plurality of document components recognized by said document component recognizing means;

document generating means for generating the plurality of documents in correspondence with the image of document inputted by said document image inputting means, in accordance with the design change instruction inputted by said design change instruction inputting means, each of which has a subset of the document components changed for design different from each other determined by said change portion determining means; and document outputting means for outputting the plurality of documents generated by said document generating means.

* * * * *